July 16, 1963 E. E. KASPAUL 3,098,126

MAGNETIC TRANSDUCER DEVICE

Filed Jan. 11, 1960

INVENTOR.
ERIKA E. KASPAUL
BY
Frank A. Steldt
ATTORNEY 3,098,126

MAGNETIC TRANSDUCER DEVICE

Erika Erna Kaspaul, Stamford, Conn., assignor to Minnesota Mining and Manufacturing Company, St. Paul, Minn., a corporation of Delaware Filed Jan. 11, 1960, Ser. No. 1,618
2 Claims. (Cl. 179—100.2)

Figure 1:
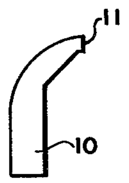

This invention relates to magnetic transducer heads for magnetic recording and reproducing apparatus and more particularly to heads having an integrally bonded, vapor-deposited, laminated metallic gapping means.

The design of magnetic heads for recording and reproducing signals from magnetic recording media such as tapes, wires, filaments and discs, has received a very great deal of attention and effort and various devices and apparatus have been disclosed heretofore as useful for these purposes. In general such magnetic heads are comprised of a magnetic circuit which is interrupted at least at one place to provide the so-called "air gap" and may be interrupted at other places necessitated by the method of construction employed. The term "air gap" was at one time quite accurate since only air intervened between the end surfaces of the magnetic circuit at this place. However, with increasing emphasis on decreasing the width of this "air gap," hereinafter frequently referred to merely as the "gap," the construction has become more and more difficult because electromagnetic considerations required strict parallelism of the surfaces to within extremely small tolerances. Planar non-magnetic shims have been employed, but even this expedient has not been entirely satisfactory when the width of the gap is reduced to the point where it is of the order of 0.001 inch and less. The difficulty is accentuated when miniaturization of the magnetic recording system is attempted since concomitantly slower tape speeds and smaller and narrower gaps are virtually essential. Not only are the difficulties of assembly of the head components enhanced, but the finishing of the head assembly also becomes more difficult, for example, the finishing of the surfaces contacted by the moving tape. Since the moving tape slowly abrades the surface of the head there is also a tendency to alteration of the geometry of the gap during use which is undesirable. Consequently, it is advantageous to provide a very hard metal, which has very low magnetic permeability and which can be worked to provide smooth surface, as the gap-filling material.

It is an object of this invention to provide a magnetic head having a gap of the order of magnitude of 1 micron in width (i.e. less than about 0.00004 in.) suitable for recording or reproducing from magnetic recording tapes.

A further object is to provide a magnetic head assembly having a gap including a very hard non-magnetic metal which can be machined and polished easily to produce a smooth long-wearing surface having desired geometrical properties including a constant width.

A still further object is to provide a magnetic head assembly having a gap made of hard material to minimize wear on the head assembly by the moving tape, in which the hard metal is supported by a soft metal to eliminate chipping and spalling during machining operations.

Yet a further object is to provide pole pieces having a gap of predetermined very small dimensions.

Other objects will become apparent from the disclosures made hereinafter.

I am aware that in United States Patent No. 2,866,011, it has been disclosed that certain non-magnetic metals such as aluminum, beryllium, gold, chromium and titanium, and non-metals such as boron, silicon, quartz or silicon monoxide can be vapor-deposited on the confronting faces of pole pieces to produce narrow gaps of less than 5 microns thickness. It is found, however, that urging together of such surfaces easily results in mechanical damage to the gap when the harder materials are used together and incomplete closure of the gap results in anomalous magnetic behavior. When softer materials such as aluminum or gold are employed, the pole pieces can be brought into proper relationship with complete closure of the gap, but the softness of the gapping metal permits wear of the edges of the gap during use.

In accordance with the above and other objects of the invention, it has now been found that a magnetic transducer device suitable for recording, reproducing or erasing signals using magnetic recording tape and having the pole pieces arranged to provide a rigidly fixed gap of a desired predetermined width of the order of 1 micron can be produced readily by using two complementary pole pieces adapted to be assembled in pole to pole relationship and having planar laminae, in a particular sequence, of relatively hard and soft metals vapor-deposited on the shaped planar gap-forming ends of the pole pieces. The planar laminae are deposited and bonded by sequentially vapor-coating the planar ends of the pole pieces. By "hard" metals, as employed herein, it is meant to designate the relatively non-ductile non-malleable metals of low magnetic perrmeability, of a hardness greater than that of the pole piece, which can be vapor-deposited while retaining their hardness. Manganese, having hardness on the Mohs' scale of 5.0, is such a metal, as its magnetic permeability approaches unity; and it is especially useful in that it can be vapor-deposited rapidly at relatively low temperatures. It has been found, however, that hard metals which retain their hardness when vapor-deposited, such as manganese, are so brittle after vapor-deposition that the metal film thus produced is easily damaged as by flaking, chipping, peeling and spalling when worked at the edges during the subsequent polishing of the head. However, by interlaminating the thin layers of vapor-deposited hard non-ductile metal used for the magnetic gap with even thinner layers of a soft, malleable metal, for example copper or gold, having hardness on the Mohs' scale of 3.0 and 2.5, respectively, flaking, spalling and peeling of the film of hard metal is eliminated, and useful, long-wearing gap structures are easily provided. Surprisingly, the laminae of soft metal used are so thin as to be light-transmissive, and viewed edge-on are submicroscopic (i.e. not resolvable using visible light) yet they can support the hard metals so as to reinforce them.

In the magnetic gaps of the invention, the hard metal is employed in planar laminae of from about 0.2 to 0.8 micron or somewhat greater in thickness, while the soft, malleable metals are used in planar laminae of the order of about 50 to 150 A. units in thickness. In this way, magnetic gaps of from less than one micron up to two microns in width (or even greater, if desired), and having advantageous characteristics, can be produced. Over 90%, and preferably about 92 to 98% of the total thickness of the gap is the thickness of the hard metal which provides for abrasion resistance at the surface of the head contacted by the moving magnetic tape. It will be apparent that when wider gaps are used, the percentage thickness of hard metal can be made greater and can be as high as about 99%.

A sequence of metals which has been found to be a particularly useful embodiment of this invention, providing a wear-resistant gap together with good magnetic properties, is the following:

copper:manganese:copper

The major portion of the total coating is the layer of manganese, about 0.3 to 0.5 micron thick, which provides a desirably hard, non-ferromagnetic material for the gap. The copper layers are each in the range of about 50 to 150 A. units in thickness. It is found that the very thin layers of copper which abut the manganese serve to support it and prevent spalling and chipping, while the hardness of the gap is not appreciably affected. The effective hardness of the spacing metals is such that wear of the magnetic head assembly by the moving tape is greatly reduced, thereby maintaining the desired geometrical relations and shapes.

The soft metal employed for the purposes of the invention must be firmly bonded to the pole piece and to the hard metal, so that the pole piece can be manipulated during assembly of the heads. The surfaces of the pole pieces should be scrupulously cleaned, for example, by ionic bombardment or "glowing." Where the soft metal used, for example, copper, does not bond easily to the iron pole piece, or has a tendency to peel away, a bonding layer is employed. Such materials are, for example chromium, pure iron or the like, which, when vapor-deposited on the pole piece, averaging about 50 A. units thick, form a strongly adherent film. The copper or other soft metal bonds readily to such films. The bonding laminae are preferably the thinnest films which can be employed. The subsequent vapor-deposited laminae adhere satisfactorily to each other and to the bonding laminae.

In a preferred embodiment of the invention, a nickel-chromium alloy layer is employed to provide for improved adhesion of the soft metal, e.g. copper, to the iron body of the pole piece. In this case, there appears to be some segregation of the chromium on the planar iron surface of the pole piece, and some segregation of nickel at the outer surface, which appears to be advantageous so far as bonding is concerned. Since adhesion is improved even when a completely continuous film is not formed, the bonding layer is just sufficient to bring about bonding, preferably not more than about 50 A. units in thickness. A nickel-chromium alloy of approximately 80 percent by weight of nickel is suitable, although other percentage compositions may be utilized with good results.

As noted, the two layers of copper or similar supporting soft metal used are of the order of 50 to 150 A. thick, respectively, i.e. about 0.005 to about 0.015 micron in thickness. Thinner films than 50 A. thickness are generally not continuous, that is, the deposition is in the form of "islands," while films greater than 150 A. units in thickness tend to alloy with the hard metals, thus possibly reducing its hardness. Despite their submicroscopic thinness, and apparently because of their malleability, these exceedingly thin laminae absorb mechanical forces of deformation when two complementary pole pieces are urged together to form a magnetic head assembly. Thus, as noted, they prevent destruction of the hard metal layer during assembly, and they further serve to protect it from mechanical damage such as chipping or peeling when the head assembly is subsequently polished to provide a smooth surface for contact with the magnetic tape. Since each pole piece is preferably coated with the gap forming material in the particularly preferred embodiment of the invention, the actual magnetic gap in this case is composed of two laminae of manganese supported by laminae of copper. If desired, one pole piece can be made with this sequence of metal layers, and the complementary pole piece made without an outer layer of copper, so that when urged together there is but a single layer of copper about 50 to 150 A. thick separating the two layers of manganese. Alternatively, the pole piece having sequential laminae of copper, manganese and copper can be used with an uncoated pole piece; however, these expedients are less desirable as perfect contact of the outer copper surface to the hard, e.g. manganese, or to the material of the pole piece is not as readily effected as with copper-to-copper confronting surfaces.

It is found that the several integrally bonded metallic layers are most satisfactorily produced on the polished or lapped planar end of the pole piece by deposition from the vaporous state using methods known in the vacuum coating art both for deposition and for the control of the thickness of the layers. In this manner, uniform layers free from voids and other defects which may adversely affect the performance of the resultant magnetic head are produced, while assuring as well very careful control of the thicknesses of layers necessary to provide such an exceedingly narrow gap as is sought. The pole piece can of course be masked in the usual manner wherever it is desired to keep the surface free from deposited metal.

The successively deposited layers may have a tendency to cover all exposed surfaces of the previously deposited laminae, including their edges. The portions of the pole pieces which contact the tape, and the sides of the pole pieces, are ground and polished to the desired dimensions after assembly. It will be apparent that in any event after assembly and machining the gaps consist of thin planar films of hard metal supported by very thin laminae of soft metal upon their surfaces and exposed at their edges.

The completed heads, when assembled, consist of a magnetic circuit or substantially closed path, which ordinarily have a coil means wound around a portion of the magnetic path. While such heads or transducers are conventional except for the gap means of the invention, it is possible to produce transducers in which the magnetic field is induced by a separate electromagnetic means, and the scope of the invention includes the use of the gap of the invention in gaps of such devices.

Figure 2:
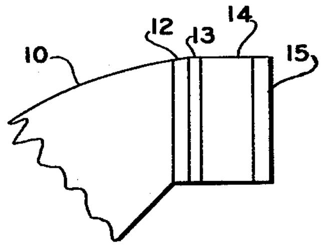
Figure 3:
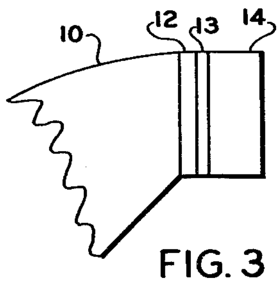
Figure 4:
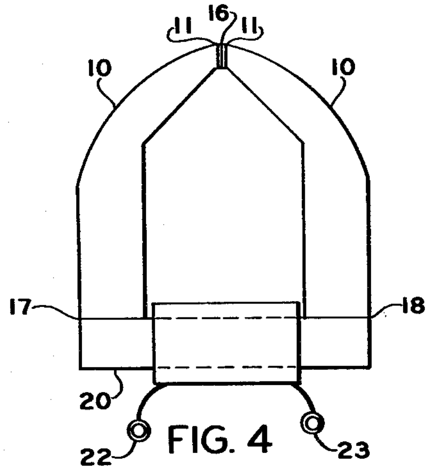
Figure 5:
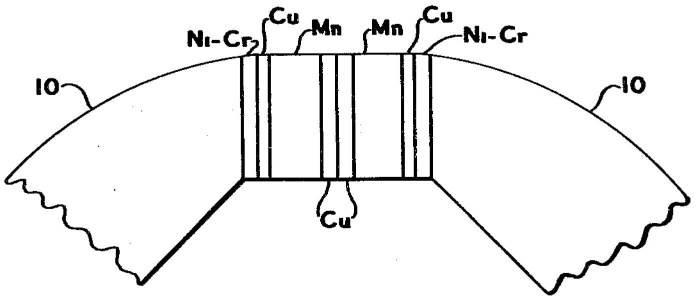

The invention is now further described by reference to the accompanying figures, in which FIGURE 1 shows a side elevation of pole piece of the invention, FIGURES 2 and 3 show enlarged views of the gap-forming means of the invention at the end of pole pieces in side elevation, FIGURE 4 shows an elevation of one manner of assembling a magnetic transducer head possessing the gap-forming means of the invention and FIGURE 5 shows an enlarged view of the gap and adjacent portions of the pole pieces of the head of FIGURE 4 in elevation.

Referring to FIGURE 1, it will be seen that the pole piece 10 of generally conventional configuration has the gap producing means 11 at the gap-forming end. The thickness of the pole piece, and of the heads described herein, is governed by the width of the magnetic track which is to be used. It will be understood that I do not wish to be bound to the particular shape of pole piece shown in these figures since it will evidently be possible to produce pole pieces within the scope of the invention which are of various dimensions or formed in other geometrical shapes. The inverted J shape shown is generally illustrative of the useful shapes of pole pieces.

FIGURE 2 shows the integrally bonded gap-producing means in position bonded to pole piece 10, in enlarged form, comprising successive adjacent planar layers proceeding outwardly from the said pole piece of a bonding layer of nickel-chromium alloy 12; of copper, 13; of manganese, 14 and of copper, 15.

FIGURE 3 shows a pole piece 10 which carries, as a gap-producing means, only layers 13 and 14, of copper and maganese, respectively, the copper being bonded to the pole piece by a nickel-chromium lamina 12. As mentioned above, a magnetic head assembly may be formed either by use of two pole pieces as shown in FIGURE 2 or by using one such pole piece with one of the type shown in FIGURE 3.

FIGURE 4 shows two pole pieces 10 and a coil and armature assembly (20 and 21) assembled to form a head. The armature 20 ordinarily will be of the same composition as the pole pieces 10 and is positioned in close and intimate contact therewith at 17 and 18. The transducer coil 21 which is shown schematically is of conventional construction and is composed of turns of wire encircling the armature 20 and has electrical terminals 22 and 23. The coil is conveniently wound directly on the armature 20 so that it is readily tested. The pieces are assembled so that the gap 16, consisting of the two gap forming means 11 with their confronting surfaces in intimate contact, and the magnetic circuit completing contacts 17 and 18, are maintained in position as by mounting in a suitable jig (not shown) and encasing the entire assembly in a non-magnetic non-conductive material, such as a synthetic resin, for example, an epoxy resin. The outer surfaces of the gap and the pole pieces adjacent thereto are ground to the desired configurations and then highly polished.

FIGURE 5 shows an enlarged view of the gap 16 showing the constituent metallic layers by chemical symbols and showing the intimate contact achieved and the smooth outer surface effected by polishing without fracture or chipping of the thicker and more brittle manganese layers or rounding of the corners of the pole pieces.

Production of pole pieces of the invention is conveniently carried out in vacuum coating apparatus with suitable heaters. The techniques for accomplishing vapor-deposition of metals are well known in the art. The course of the coating operation can be followed by measuring the decrease of transmission of light of test glass plates coated simultaneously with the pole pieces. Each decrease of transmission to 10 percent of the original is found to correspond to the deposition of a layer of nickel-chromium alloy, copper or manganese about 343 A. units (.0343 micron) thick. One or more neutral density filters for example, permitting transmission of 1 percent of the incident light, depending upon the total deposit of metal and number or test glasses, are included in the external portion of the system, interposed between the light source and the test glass plates, so that the test glasses, which are externally manipulable, can each be used for two or three successive depositions of metal. If desired, the total thickness of the layers depositioned can also be verified by determining the total weight of metal deposited on a glass plate of known area.

In an apparatus of the above type are placed 24 pole assemblies as shown in FIGURE 1, bolted to a stainless steel plate with the planar face or confronting portion of each pole piece upward, and mounted in a rotary holder. Eight test glasses for determination of decrease of light transmission mounted by means of drop-in holders on a rotatable shaft through the bell jar and 4 control glass plates each 3.5 x 5.0 inches are mounted on the same rotary holder as the heads. The apparatus is sealed, evacuated to about $5\times10^{-3}$ mm. Hg pressure and a stream of argon and hydrogen is passed through the apparatus while the several objects are bombarded with ions using 20 milliamperes at 10,000 volts for 4 minutes. Deposition of the different metallic layers is thereafter accomplished at $10^{-5}$ mm. Hg pressure by successive heating of suitable evaporation sources. In the case of the preferred embodiment of the invention, there are a Nichrome source, a copper source, and a manganese source, and these conveniently consist of pieces of these metals which are heated electrically by means of a tungsten filament or the like.

The deposited layers of nickel-chromium alloy and copper are very thin. Deposition of the former is carried out until there is 80 percent transmission of the test glass (less than 50 A.) and of the latter to 40 percent transmission of the same test glass (about 100 A.). Manganese of 99.99% purity is then deposited to 10 percent transmission and deposition is continued as each of the 7 other test glasses is successively positioned and reduced to 10 percent transmission. The neutral density filter is removed from its position in the light path of the measuring device and the second test glass (previously coated with about 343 A. thick layer of managanese) is positioned and the measuring instrument adjusted to 100 percent transmission. Deposition of manganese is continued to 10 percent transmission on this glass, and 10 percent on each of two others (original test glasses 3 and 4). At this point a layer of manganese about 0.35 micron thick has been deposited. Original test glass 5 is positioned and copper is deposited to about 38 percent transmission (about 150 A. thick) as the final lamina. Throughout the operation pressure is maintained at about $6\times10^{-6}$ to $1.5\times10^{-5}$ mm. Hg.

The apparatus is disassembled and the coated glass plates and pole pieces removed from the supports. One of the glass plates with the metallic coating is weighed and the coating is then removed (by dissolving in aqua regia) and the plate again weighed. The lost metal is found to weigh 31 mgm. which is calculated to represent a layer of manganese (sp. gr. 7.2) 0.38 micron thick (the alloy and copper layers are assumed to be negligible in the calculation). The polished planar end surfaces of the pole pieces and the stainless steel mounting plate are found to have an integrally bonded metallic coating which is very shiny and smooth and copper colored owing to the last copper layer. Pairs are fastened together in suitable jigs with the coils inserted and the assembly is then encapsulated as in an epoxy resin, to form magnetic recording head assemblies which are readily machined and finished to the desired shape and dimensions and are suitable for recording, reproducing or erasure of magnetically recorded information, e.g. a sound track. These heads have a gap about .8 micron in width. The thickness of the manganese is about 95% of the gap thickness.

What is claimed is:

1. In a magnetic transducer head for magnetic recording-reproducing apparatus, a magnetic core for a magnetic circuit having pole pieces with substantially planar parallel confronting faces defining a magnetic gap, the said magnetic gap being completely filled by laminae of non-magnetic metals coextensive in area with the said faces and with each other and vapor deposited on the said faces in substantially uniform thickness and integrally bonded to at least one of said faces, and consisting of a first planar lamina of a soft, malleable metal of low magnetic permeability having hardness on the Mohs' scale of the order of not greater than about 3, and of thickness in the range of about 50 to 150 A. units, bonded to a pole piece face; a second lamina of a substantially non-malleable metal of low magnetic permeability of hardness greater than that of the magnetic pole piece, of the order of not less than about 5, and thickness in the range of about .2 to about .8 micron, bonded to said first lamina, and a third lamina of the said relatively soft metal of substantially uniform thickness in the range of about 50 to 150 A. units bonded to said second lamina.

2. In a magnetic transducer head for a magnetic medium recording-reproducing apparatus, a magnetic core for a magnetic circuit having two pole pieces with substantially planar parallel faces forming a magnetic gap, the said gap being completely filled by sequential coextensive laminae of vapor deposited metal consisting of a substantially uniformly thick layer of copper of thickness in the range of about 50 to 150 A. units, a substantially uniformly thick layer of manganese of thickness in the range of about .3 to 0.5 micron, adhered to the said copper layer, and a second substantially uniformly thick layer of copper of thickness in the range of about 50 to 150 A. units adhered to the said manganese layer; the thickness of the said manganese layer being from about 92 to 98 percent of the total gap width; at least one of said layers of copper being adhered to one of the said pole piece faces.

References Cited in the file of this patent

UNITED STATES PATENTS

| | | |
|---|---|---|
| 2,535,712 | Wolfe | Dec. 26, 1950 |
| 2,632,816 | Gratian | Mar. 24, 1953 |
| 2,748,031 | Kafig | May 29, 1956 |
| 2,850,582 | De Raemy | Sept. 2, 1958 |
| 2,866,011 | Kornei | Dec. 23, 1958 |

FOREIGN PATENTS

| | | |
|---|---|---|
| 691,505 | Great Britain | May 13, 1953 |